J. P. Troxell.
Stoves for Heating Sad-Irons.
N° 72242. Patented Dec. 17, 1867.
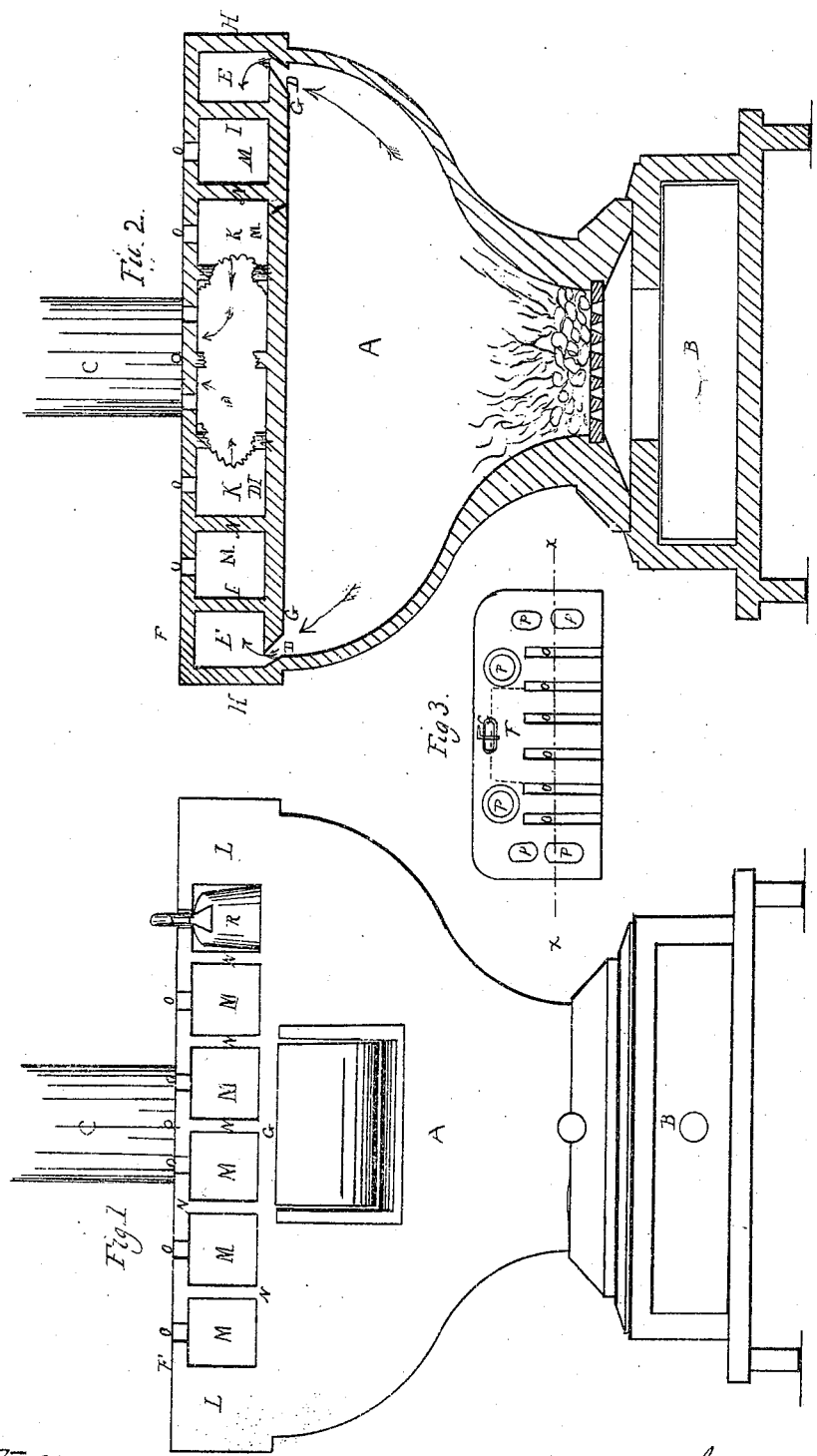
Witnesses
J. M. Kenny
Wm A. McKenny
Inventor
John P. Troxell
By Wiedersheim & Co.
Attorneys

United States Patent Office.

JOHN P. TROXELL, OF HANCOCK, MARYLAND.

Letters Patent No. 72,242, dated December 17, 1867.

IMPROVEMENT IN STOVES FOR HEATING SAD-IRONS.

*The Schedule referred to in these Letters Patent and making part of the same.*

TO ALL WHOM IT MAY CONCERN:

Be it known that I, JOHN P. TROXELL, of Hancock, in the county of Washington, and State of Maryland, have invented a new and useful Improvement in Stoves for Heating Sad-Irons; and I do hereby declare the following to be a full and correct description of the same, sufficient to enable others skilled in the art to which my invention appertains to understand and construct the same, reference being had to the accompanying drawings, which make part of this specification, and in which—

Figure 1 is a front elevation of my improved stove.

Figure 2 is a longitudinal vertical section of the same in the line $x\,x$, fig. 3; and Figure 3 is a plan view of the same on a reduced scale.

Similar letters of reference indicate corresponding parts in the several figures.

The nature of my invention consists in providing a small stove with square recesses of peculiar construction, into which the sad-irons are placed to heat, the heat being at the same time used for cooking and other purposes.

A, in the drawings, represents the body of the stove resting on the ash-box or receptacle B. The products of combustion and heat do not pass directly from the fire-box into the smoke-pipe C, but are conducted through openings, D, into and through a chamber, E, which is formed by the two plates F and G, the sides H I K and the front plate L, and which leaves an open space in the front of the top part of the stove. This space is divided into several square recesses or parts M by means of partitions N which are formed on the plates F and G and the side K. The top plate F in the centre of each recess M is provided with a slot, O, extending the whole length of the recess. The top plate F is also provided with holes, P, of various sizes, over the chamber E, into which holes pots or kettles may be placed for cooking purposes. The sad-iron R slides into the recess M, as shown in fig. 1, the handle passing along through the slot O. The iron is thus heated on all sides, and not only at the bottom alone, as is the case when it is placed merely on the top of the stove, for the chamber E conducts the heat all around the recesses M, and heats the top plate F as well as the sides H I. In places where no gas is made, and the modern gas-heater for sad-irons cannot be used, this stove is of the greatest use. It serves as heating and cooking-stove, whilst at the same time excellent means are provided to heat sad-irons. The stove-pipe is placed on the centre of the chamber E, and the heat passes out as shown in arrows in fig. 2.

Having thus described my invention, what I claim as new, and desire to secure by Letters Patent, is—

1. The horizontal recesses M in the top part of the stove, provided with slots O formed by the partitions N, and the chamber E at the sides and rear of the recesses M, substantially as and for the purposes described.

2. The chamber E, formed as described, connecting with the fireplace by means of the openings D, and provided with holes P for cooking purposes, in combination with the recesses M, substantially as and for the purposes described.

The above specification of my improvement in stoves for heating sad-irons, signed this fourth day of September, 1867.

JOHN P. TROXELL.

Witnesses:
ALEX. A. C. KLAUCKE,
D. OURAND.